(12) United States Patent
Raje et al.

(10) Patent No.: US 11,096,032 B2
(45) Date of Patent: *Aug. 17, 2021

(54) DYNAMIC PUBLIC WARNING SYSTEM FOR IN-VEHICLE ENODEB

(71) Applicant: Parallel Wireless, Inc., Nashua, NH (US)

(72) Inventors: Ravikiran Raje, Pune (IN); Sridhar Donepudi, Nashua, NH (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/902,516

(22) Filed: Jun. 16, 2020

(65) Prior Publication Data
US 2020/0314624 A1  Oct. 1, 2020

Related U.S. Application Data

(63) Continuation of application No. 15/836,754, filed on Dec. 8, 2017, now Pat. No. 10,687,192.

(60) Provisional application No. 62/431,468, filed on Dec. 8, 2016.

(51) Int. Cl.
| | |
|---|---|
| *H04W 4/40* | (2018.01) |
| *H04W 4/90* | (2018.01) |
| *H04W 4/029* | (2018.01) |
| *H04W 4/02* | (2018.01) |

(Continued)

(52) U.S. Cl.
CPC ............. *H04W 4/90* (2018.02); *G07C 5/00* (2013.01); *H04W 4/023* (2013.01); *H04W 4/029* (2018.02); *H04W 4/40* (2018.02); *H04W 64/00* (2013.01); *G07C 5/008* (2013.01); *H04W 64/006* (2013.01)

(58) Field of Classification Search
CPC ....... H04W 4/02; H04W 4/023; H04W 4/029; H04W 4/04; H04W 4/043; H04W 4/046; H04W 4/90; H04W 4/40; H04W 64/00; H04W 64/006; H04W 4/025; H04W 4/42; H04W 4/44; H04W 4/46; H04W 4/48; C07C 3/02; C07C 3/08; C07C 5/00; C07C 5/008; C07C 7/00
See application file for complete search history.

(56) References Cited

U.S. PATENT DOCUMENTS

| | | | | |
|---|---|---|---|---|
| 6,345,186 | B1 * | 2/2002 | Schultz | H04W 36/24 455/436 |
| 8,877,247 | B2 * | 11/2014 | Matthews | A61P 25/36 424/490 |
| 10,687,192 | B2 * | 6/2020 | Raje | H04W 4/029 |

(Continued)

*Primary Examiner* — Jean A Gelin
(74) *Attorney, Agent, or Firm* — Michael Y. Saji; David W. Rouille

(57) ABSTRACT

A method is disclosed, comprising: sending position information reflecting a current position of a base station to a coordinating server; receiving a warning request message from an operator core network containing an emergency area; calculating a geographic area corresponding to an emergency tracking area by translating the emergency area from a set of base stations to the geographic area; determining whether the base station may be outside of a threshold distance from the geographic boundary of the emergency tracking area; and sending the warning request message when the base station may be within the threshold distance from the geographic boundary of the emergency tracking area.

15 Claims, 8 Drawing Sheets

(51) Int. Cl.
*G07C 5/00* (2006.01)
*H04W 64/00* (2009.01)

(56) References Cited

U.S. PATENT DOCUMENTS

| | | | | |
|---|---|---|---|---|
| 2005/0197748 | A1* | 9/2005 | Holst | H04B 7/18506 |
| | | | | 701/3 |
| 2009/0231189 | A1* | 9/2009 | Reddy | G08G 1/20 |
| | | | | 342/357.42 |
| 2011/0111782 | A1* | 5/2011 | Aoyagi | H04W 52/0206 |
| | | | | 455/508 |
| 2011/0171928 | A1* | 7/2011 | Vikberg | G08B 27/005 |
| | | | | 455/404.1 |
| 2013/0116908 | A1* | 5/2013 | Oh | G05D 1/0278 |
| | | | | 701/96 |
| 2017/0324817 | A1* | 11/2017 | Oliveira | H04L 67/10 |
| 2018/0096587 | A1* | 4/2018 | Erman | H04W 4/90 |

\* cited by examiner

DYNAMIC PUBLIC WARNING SYSTEM FOR IN-VEHICLE ENODEB

CROSS-REFERENCE TO RELATED APPLICATIONS

This application is a continuation under 35 U.S.C. § 120 of U.S. patent application Ser. No. 15/836,754, filed Dec. 8, 2017, and entitled "Dynamic Public Warning System for In-Vehicle eNodeB," which itself is a non-provisional conversion of, and claims the benefit of priority under 35 U.S.C. § 119(e) to U.S. Provisional Pat. App. No. 62/431,468, titled "Dynamic Public Warning System for In-Vehicle eNodeB" and filed on Dec. 8, 2016, which is also hereby incorporated by reference in its entirety for all purposes. This application also hereby incorporates by reference for all purposes U.S. Pat. No. 8,867,418, entitled "Methods of Incorporating an Ad Hoc Cellular Network Into a Fixed Cellular Network," filed Feb. 18, 2014; U.S. Pat. App. Pub. No. 2015/0045063 A1, entitled "Multi-RAT Node Used for Search and Rescue" filed Aug. 7, 2014; U.S. Pat. App. Pub. No. 2016/0044531 A1, entitled "Congestion and Overload Reduction," filed Aug. 10, 2015; U.S. Pat. App. Pub. No. 2016/0088585 A1, entitled "Radio Operation Switch Based on GPS Mobility Data," filed Sep. 24, 2015; U.S. Pat. App. Pub. No. 2016/0142880 A1, entitled "Enhanced Mobile Base Station," filed Nov. 19, 2015; U.S. Pat. App. Pub. No. 2016/0094968 A1, entitled "Enabling High-Power UE Transmission," filed Sep. 28, 2015; U.S. Pat. App. Pub. No. 2016/0119867 A1, entitled "Out-of-Band Power Down Notification," filed Oct. 26, 2015; and U.S. Pat. App. Pub. No. 2016/0288744, entitled "Power Management for Vehicle-Mounted Base Station," filed Mar. 30, 2016, respectively.

This application also hereby incorporates by reference 3GPP Specifications 3GPP TS 36.300, entitled "Evolved Universal Terrestrial Radio Access (E-UTRA) and Evolved Universal Terrestrial Radio Access Network (E-UTRAN); Overall description; Stage 2"; 3GPP TS 36.306, entitled "Evolved Universal Terrestrial Radio Access (E-UTRA); User Equipment (UE) radio access capabilities"; 3GPP TS 29.168, entitled "Cell Broadcast Centre interfaces with the Evolved Packet Core; Stage 3"; 3GPP TS 36.304, entitled "Evolved Universal Terrestrial Radio Access (E-UTRA); User Equipment (UE) procedures in idle mode"; 3GPP TS 22.268, entitled "Public Warning System (PWS) requirements"; 3GPP TS 25.469, entitled "UTRAN Iuh interface Home Node B (HNB) Application Part (HNBAP) signalling"; 3GPP TS 23.041, entitled "Technical realization of Cell Broadcast Service (CBS)"; 3GPP TS 36.413, entitled "Evolved Universal Terrestrial Radio Access Network (E-UTRAN); S1 Application Protocol (S1AP)"; 3GPP TS 36.331, entitled "Evolved Universal Terrestrial Radio Access (E-UTRA); Radio Resource Control (RRC); Protocol specification"; 3GPP TS 36.302, entitled "Evolved Universal Terrestrial Radio Access (E-UTRA); Services provided by the physical layer"; 3GPP TS 25.468, entitled "UTRAN Iuh Interface RANAP User Adaption (RUA) signalling"; 3GPP TS 36.508, entitled "Evolved Universal Terrestrial Radio Access (E-UTRA) and Evolved Packet Core (EPC); Common test environments for User Equipment (UE) conformance testing"; 3GPP TS 36.523.1, entitled "Evolved Universal Terrestrial Radio Access (E-UTRA) and Evolved Packet Core (EPC); User Equipment (UE) conformance specification; Part 1: Protocol conformance specification"; 3GPP TS 36.523.2, entitled "Evolved Universal Terrestrial Radio Access (E-UTRA) and Evolved Packet Core (EPC); User Equipment (UE) conformance specification; Part 2: Implementation Conformance Statement (ICS) proforma specification"; 3GPP TS 23.401, entitled "General Packet Radio Service (GPRS) enhancements for Evolved Universal Terrestrial Radio Access Network (E-UTRAN) access," in their entirety for all purposes.

BACKGROUND

A public warning system (PWS) for a 4G Long Term Evolution (LTE) network may be based on the warning message transmission messages as defined in LTE 3GPP specification 3GPP TS 36.413 Release 9 and the warning message delivery procedure as defined in LTE 3GPP specification 3GPP TS 23.401 release 9, and further relies on the LTE S1AP protocol procedures Write-Replace Warning Request/Response and Kill Request/Response.

As well, the Cell Broadcasting Service (CBS) has been used to inform users about an emergency situation arising in their geographic location(s) due to natural or man-made calamities. CBS thus provides a useful alternate communication channel for government agencies to let people know about emergency situations and ask people to stay away from danger zones. Similar systems are known by various names in different part of the world, such as Earthquake and Tsunami Warning System (ETWS) in Japan, Commercial Mobile Alert System (CMAS) in the USA, etc. PWS service or CBS is implemented at a Cell Broadcast Center (CBC). The CBC is in charge of receiving messages sent by a Cell Broadcast Entity (CBE). On reception of the messages from the CBE, the CBC formats the messages by adding certain parameters and forwards the messages to the Mobile Management Entity (MME) in a Long Term Evolution (LTE) network or the Base Station Controller (BSC) in a Global System for Mobile Communications (GSM) network. The MME or BSC forwards the warning messages to eNodeBs or NodeBs connected to them, so that the users camped on to the eNodeBs or NodeBs receive the warning message and hopefully stay away from the danger. The PWS is based on standards developed by ETSI and 3GPP, specifically 3GPP TS 36.413, 3GPP TS 23.401, and is based on an LTE S1AP protocol procedures, e.g., Write-Replace Warning Request/Response, and Kill Request/Response.

The purpose of the public warning system is thus to alert cell users within areas which are under threat due to natural or other calamities. The public warning system in a Long Term Evolution (LTE) network may have following components: cell broadcasting entity (CBE), cell broadcasting centre (CBC), mobility management entity (MME), and eNodeB. The public warning system may be devised with a view to alerting areas that are under threat due to potential earthquakes or tsunamis, etc.

SUMMARY

Systems and methods for a dynamic public warning system for in-vehicle eNodeBs are disclosed.

In a first embodiment, a method is disclosed, comprising: sending position information reflecting a current position of a base station to a coordinating server; receiving a warning request message from an operator core network containing an emergency area; calculating a geographic area corresponding to an emergency tracking area by translating the emergency area from a set of base stations to the geographic area; determining whether the base station may be outside of a threshold distance from the geographic boundary of the emergency tracking area; and sending the warning request message when the base station may be within the threshold distance from the geographic boundary of the emergency tracking area.

The method may further comprise: calculating a future position of the base station at the coordinating server; and tracking the current position of the base station over time at the coordinating server for sending the warning message. The method may further comprise determining, based on the current position of the base station and based on a geographic boundary of the emergency area and based on the threshold distance, whether the base station may be physically located within the threshold distance of the emergency area. The position information reflecting the current position of the base station may be based on global positioning system (GPS) coordinates, and the threshold distance may be a distance in miles or kilometers. The base station may be currently stationary and the base station may be configured to request provisioning information from the coordinating server when the base station activates. The warning message may be one of a list of tracking area codes, emergency area IDs, cell global identifiers (CGIs), or extended cell global identifiers (ECGIs), and may be received from a central broadcast center. The base station may be a multi-radio access technology (multi-RAT) base station, and The base station may be configured to further deliver alert messages to users on a plurality of RATs. The base station may be physically mounted in a moving vehicle.

The base station may be further configured to provide at least one of 3G and 4G access when a vehicle of the base station becomes stationary, and The base station may be configured to provide Wi-Fi access when the vehicle of the base station may be in motion. The base station may be associated with the coordinating server as a virtual base station of the coordinating server, such that the operator core network addresses the base station through the virtual base station at the coordinating server. The base station may be a multi-radio access technology (multi-RAT) base station configured to set up a mesh network with other multi-RAT base stations when deployed in a mesh network configuration to an area without network coverage. The method may further comprise periodically sending the information reflecting the current physical location of the base station, or sending the information reflecting the current physical location of the base station upon request from the coordinating server. The warning message may be a write-replace warning request message, and the base station may be a Long Term Evolution (LTE) base station, and The method may further comprise receiving a warning request message from a central broadcast center (CBC) in an operator core network.

In a second embodiment, a base station in a mobile network is disclosed, comprising: a processor; and a memory coupled to the processor, the memory containing instructions which, when executed by the processor, cause the base station to perform: sending position information reflecting a current position of the base station to a coordinating server; receiving a warning request message from an operator core network containing an emergency area; calculating a geographic area corresponding to an emergency tracking area by translating the emergency area from a set of base stations to the geographic area; determining whether the base station may be outside of a threshold distance from the geographic boundary of the emergency tracking area; and sending the warning request message when the base station may be within the threshold distance from the geographic boundary of the emergency tracking area.

The base station may be a multi-radio access technology (multi-RAT) base station, and The base station may be configured to further deliver alert messages to users on a plurality of RATs. The base station may be physically mounted in a moving vehicle. The base station may be further configured to provide at least one of 3G and 4G access when a vehicle of the base station becomes stationary, and The base station may be configured to provide Wi-Fi access when the vehicle of the base station may be in motion. The base station may be associated with the coordinating server as a virtual base station of the coordinating server, such that the operator core network addresses the base station through the virtual base station at the coordinating server. The base station may be a multi-radio access technology (multi-RAT) base station configured to set up a mesh network with other multi-RAT base stations when deployed in a mesh network configuration to an area without network coverage.

DETAILED DESCRIPTION

Figure 1:
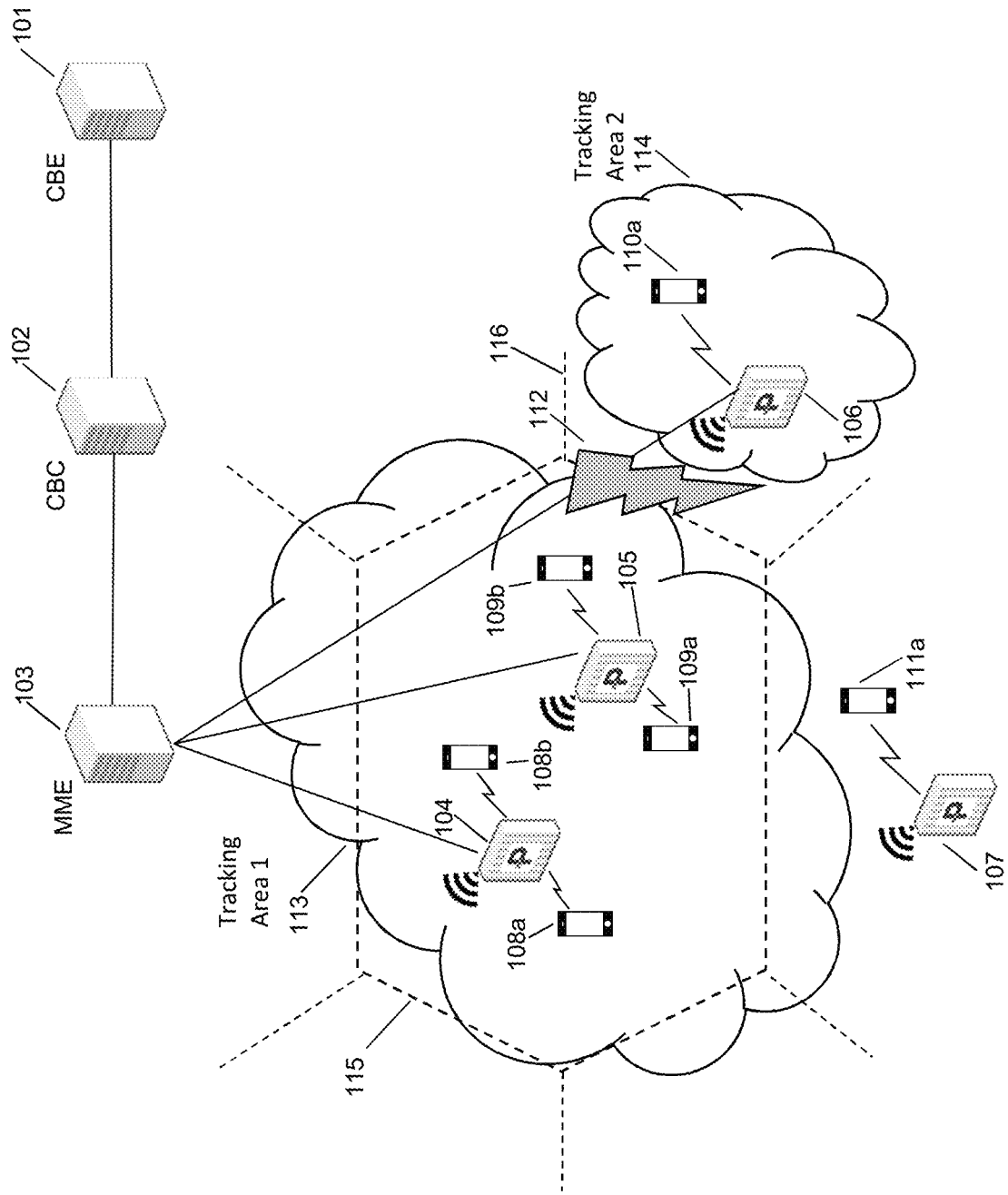
FIG. 1 is a network diagram of a public warning system (PWS).

The detailed description set forth below is intended as a description of various configurations of the subject matter and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details. In some instances, well-known structures and components are shown in block diagram form in order to avoid obscuring the concept of the subject technology.

Overview

In an LTE network, the geographical locations can be divided into tracking areas (TAs) or emergency areas (EAs). The CBE and CBC may trigger the warnings to potential natural calamities in specific geographic areas and forward it to the MME. The MME uses a cell-id level, tracking area level, or emergency area level granularity to warn all users within that specific area to the potential threats. This is done by invoking Write Replace Warning Procedures. The Write Replace Warning Procedures cause either a Cell ID List, Tracking Area List, or Emergency Area List generated with a list of areas together with the warning contents included in the message. The eNodeBs upon receipt of Write Replace request from the MME, floods these Write Replace Warning messages in the specified tracking area, emergency area or cells, with the warning message. The warning messages are transmitted by the eNodeBs with a periodicity mentioned in the procedure, or continuously as specified, until the Kill Request message is received from MME indicating to stop transmission of the warning messages. The warning messages are delivered to each user equipment (UE) camped on to the eNodeBs, and the UE alerts its user in some fashion of the potential danger.

The problem with the current PWS is that the warning message are flooded in specific areas based on tracking area or emergency area, and fixed eNodeBs are notified to warn UEs camped on to the eNodeBs of potential threat. In the case that the eNodeBs that are mobile, e.g., installed in an emergency vehicle such as a police cruiser, a fire engine, or a public transport system such as a bus, or a train, such eNodeBs would not get a warning message until they enter the danger zone. This may be potentially dangerous and life-threatening in certain scenarios, for example, when a bus carrying passengers and having an in-vehicle eNodeB is entering or approaching the area while unaware of the threat.

A solution to this problem is to use Parallel Wireless's HetNet Gateway (HNG) (TM) with its self-organizing networking (SON) module, and in-vehicle eNodeB to warn users approaching an area under threat as per the warning message transmission procedures as defined in an LTE 3GPP specification 3GPP TS 36.413 Release 9. The present solution may be implemented using another base station and network coordinator as well, as follows.

Through its HetNet Gateway (HNG) (TM), the Parallel Wireless solution can orchestrate and manage the Radio Access Network (RAN) across multiple technologies, including 3G, 4G and Wi-Fi, with high ease of use. The centerpiece of the Parallel Wireless solution is the HetNet Gateway, which is the wireless industry's first carrier-grade, high-performance RAN orchestrator that is based on software-defined networking (SDN) and network functions virtualization (NFV), and is 100 percent compliant with all open and standard interfaces as defined by the 3rd Generation Partnership Project (3GPP). The Parallel Wireless HNG virtualizes the RAN interfaces to manage the 4G and 3G (Long Term Evolution, or LTE, and universal mobile telecommunications system, or UMTS) RANs (Home NodeBs/NodeBs and eNodeBs/HeNodeBs) in real-time via multi-technology self-organizing network (SON) and gateway functionality while abstracting RAN changes from the core network and the core network itself from the RAN. The Parallel Wireless HNG virtualizes thousands of base stations to look like a smaller number of virtualized "boomer cells" to the core. The Parallel Wireless HNG also virtualizes radio network nodes such as Wi-Fi access points (APs), eNodeBs and NodeBs and makes them self-configurable, self-adjustable, and self-healing, helping with initial installation and ongoing maintenance. The Parallel Wireless HNG acts like a virtual radio network controller (vRNC or virtual RNC) for multi-RAT network handling resources for different technologies 3G, LTE/4G and Wi-Fi while optimizing call processing towards radio and core network elements such as the mobile switching center (MSC), serving global packet radio system (GPRS) support node (SGSN), gateway GPRS support node (GGSN), evolved packet core (EPC) for 4G, home subscriber server (HSS), and policy charging and rules function (PCRF). The HNG may also be referred as a coordinating server, or a gateway server in this disclosure. In some embodiments, a gateway server may be used; in other embodiments, the server may not be required to be positioned in the network as a gateway and may be used for its coordinating ability only.

In an LTE network, the HetNet Gateway (Parallel Wireless HNG) node logically sits between the eNodeBs and the MNO Evolved Packet Cores (EPCs). It orchestrates thousands of base stations to look like a single one to the MNO packet core. The Parallel Wireless HNG virtualizes the radio network resources such as eNodeBs and backhaul and makes them self-configurable and self-adjustable. It acts as HeNBGW and vRAN/virtual eNB. It allows plug and play operation of CWS nodes and mesh backhaul, and allows them to form an ad hoc network as the nodes come in to the network and leave. In a 3G network, the Parallel Wireless HNG provides the Home Node B Gateway and virtual RNC functionality. For Wi-Fi, the Parallel Wireless HNG acts as a Wireless LAN Controller (WLC), Evolved Packet Data Gateway (ePDG) and Trusted Wireless Access Gateway (TWAG). These are all configurable options and one or the other can be configured based on an operator's requirements. In some configurations Parallel Wireless HNG also acts as an EPC. The HetNet Gateway sits between the RAN and the core network, and as a result is in a position to provide proxying and virtualization for any-G and for any core or multiple cores, as well as being able to perform deep packet inspection and lawful intercept for data flowing through the network that would be encrypted if intercepted at a different point in the network.

Certain embodiments may also use the Parallel Wireless Converged Wireless System. Paired with the Parallel Wireless HNG, the Parallel Wireless base station, the Converged Wireless System (CWS) (TM), is a multi-RAT base station with LTE, Wi-Fi, and 3G technologies that provides a flexible outdoor and in-vehicle solution in conjunction with the Parallel Wireless HNG. The combined system is a cloud-based network orchestration system that maximizes virtualization, and functions in a 3GPP standards-based Heterogeneous Network (HetNet) to bring 3G, Wi-Fi and 4G operators better technology at lower cost. The Parallel Wireless solution addresses key challenges in delivering 3G/4G coverage, capacity, and quality of service (QoS), regardless of the cell size, e.g., femtocell, pico cell, micro cell, metro cell, or macro cell. The Parallel Wireless solution is also easy to deploy with automated configuration and ongoing optimization. The CWS may also be referred to as eNodeB, NodeB, Home NodeB (HNB), Evolved-HNB (eHNB), base station, etc. in this disclosure.

In some embodiments, Parallel Wireless HNG may include 3G SON and security gateway functionality. In some embodiments, CWSes are virtualized by which HNB endpoint (towards external HNBGW) is configured. There may be multiple CWSes virtualized per HNB endpoint or it may be a single CWS (macro hand over). In some embodiments, a SON module may provide the functionality to provision CWS with information like Cell-ID, PSC and other OA&M details. SON may provide API to validate CWS attributes at the time of HNB registration. In some embodiments, mobility optimization (a SON feature) may be enabled. So, in a deployment scenario, there will be a set of CWSes which are emulated one-to-one with external HNBGW and there will a set of CWSes which as a group is emulated as one HNB with external HNBGW. The CWSes may be grouped in various ways. In some embodiments Parallel Wireless HNG based HNBGW uses CWS grouping to virtualize resources and allow flexible and auto assignment of location area code (LAC)/service area code (SAC), etc.

As described above, the coordinating server may virtualize all the cells connected on an access side and presents itself as a large macro eNodeB towards a mobile operator's core network. This method of virtualization may be made possible by assigning a twenty-bit macro eNodeB ID, that is advertised towards the core network, and each cell or base station that may connect to the coordinating server may be assigned a twenty-eight bit E-UTRAN Cell Identifier (ECI). ECI assigned to each cell or base station may have most significant twenty bits same as macro eNodeB ID assigned to the coordinating server. In essence, each cell on the radio access network side may be like a sector of a large macro. As ECI is a total of twenty-eight bits and the macro eNodeB ID is twenty bits, there may be a total of 255 cells that may be represented by the coordinating server as a large macro eNodeB to the core network, in some embodiments. A coordinating server therefore may appear as one large macro eNodeB, referred in this disclosure as a virtual eNodeB (VeNB), virtualizing up to 255 different Cell ID base stations to the core network.

In accordance with some embodiments, the coordinating server dynamically provisions each base station connecting to the coordinating server while acting as VeNB. As such, each base station may not be permanently connected to one coordinating server, but may connect to different coordinating servers at different times. This may be true specifically for in-vehicle eNodeBs. It has been assumed here that a E-UTRAN Cell Global Identifier (ECGI) of a base station may change as the base station loses connectivity and reconnects to the coordinating server. For dynamic provisioning of the base stations via self-organizing network (SON) module, the coordinating server may be configured with at least one zone and one VeNB ID. It is noted that in some embodiments, the coordinating server may be assigned multiple VeNB IDs, with each VeNB ID being an instance of VeNB. Each zone may have a list of public land mobile network identifiers (PLMN IDs), a list of tracking area codes (TACs), a list of emergency area identifiers (EAIDs), and/or other area identifiers. In some embodiments, each VeNB instance is associated with a zone, with the zone to VeNB instance relationship being one to many. The VeNB instance here may be an eNodeB ID.

In some embodiments, provisioning may be performed as follows. When a base station discovers a coordinating server, the base station sends a configuration request to the coordinating server. The configuration request from the base station to the coordinating server may contain a unique base station ID, an IP address for the coordinating server to connect to and capabilities of the base station hardware (inventory info). The coordinating server in accordance with configured policies may then perform allocation of dynamic and static configuration parameters. The coordinating server may assign a VeNB instance to the base station, thereby assigning, e.g., PLMN, eNodeB Id, TAC, EAID to the cell. As mentioned, the zone to VeNB relationship is one to many, and there may be two cells, or two base stations assigned same value for PLMN, TAC, EAID. The coordinating server may also add the base station to one or more lists, including an emergency area list, and may also inform the base station of its membership in one or more lists.

In accordance with some embodiments, an example of a coordinating server and multiple base station configuration is described here. The coordinating server has two virtual eNodeB ID instances VeNB1 and VeNB2 as venb20089 and venb20090 respectively. There may be one zone, e.g., a venb-zone named public-safety. The public-safety zone may further have emergency area id as 123, public land mobile communication network identifier as 00132 and a list of tracking area codes 2311, 2313, 3412, and 4356. The public-safety zone is associated with the VeNB1 and VeNB2 instances. The base station BS1 when connects to the coordinating server, the base station BS1 may have a VeNB1 instance with PLMN Id as 0x000132, eNodeB ID as 0x20089, and Cell ID 0x00. Another base station BS2 may have a VeNB2 instance with PLMN Id as 0x00132, eNodeB ID as 0x20090, and Cell ID 0x00. The coordinating server, has appears to the core network using one ECGI, or a macro eNodeB ID, the macro eNodeB ID is mapped to a plurality of base stations having a unique ECGI, that is a combination of PLMN Id, eNodeB ID, and Cell ID.

While the above describes relationship to the coordinating server and various base stations connected to the coordinating server, PLMN ID, Emergency Area ID, or Tracking Area Code are important as these fields identify the area that needs to be notified of a potential danger. As identified in 3GPP TS 29.168, 3GPP TS 22.268, and 3GPP TS 23.041, MME receives a Write-Replace Warning Request message from CBC when CBE detects an emergency and potential hazardous situation for the public. The Write-Replace Warning Request message is further described below; in some embodiments, another message that provides warnings may be used, for example in embodiments that are implemented on another RAT. In some embodiments, the write-replace warning request message or equivalent, once generated, may be interworked to another message appropriate for the other RAT.

The warning-area-list is an optional field according to the 3GPP TS 36.413 that may be used to identify the area having an emergency situation, e.g. tsunami, earthquake, or the like. The Write-Replace Warning Request message as described in 3GPP TS 36.413 has following fields: message-identifier, serial-number, warning-area-list, repetition-period, extended-repetition-period, number-of-broadcast-request, warning-type, warning-security-info, data-coding-scheme, warning-message-contents, and concurrent-warning-message-identifier. The warning-area-list, according to 3GPP TS 36.413, may identify the possible area of emergency by either a call-id list, an emergency-area-id list, or a tracking-area-identifier list. The cell-id list is a list of ECGI, that as explained above is formed by a combination of PLMN ID and twenty-eight bits ECI (ECI plus CellID).

There may be more than one ECGI listed in the warning-area-list field. Likewise, the emergency-area-id list is a list of emergency area ids that are required to be notified due to potential dangerous situation. The emergency area ids are provisioned by the user or operator of the network for each zone, where each zone may be further mapped to more than one VeNB ID instance, a VeNB ID instance assigned to the base station. A list of tracking-area-identifier list may include more than one tracking area identifier, where the tracking area identifier is formed of PLMN or mobile country code (MCC) or mobile network code (MNC) and tracking area code. As described above, each VeNB instance assigned to a base station is populated with PLMN ID and tracking area code at least. PLMN ID is formed of MCC and MNC.

In some embodiments, when an MME located in the mobile operator's core network receives a Write-Replace Warning Request message, it forwards it to the coordinating server since the coordinating server virtualizes base stations in the radio access network (RAN) and appears to the MME as macro eNodeB. In some embodiments, the coordinating server may not be virtualizing all the eNodeBs, and may be connected to and managing macro eNodeBs as well. The coordinating server based on the warning-area-list field of the received message identifies the eNodeBs, virtualized or non-virtualized, that need to be notified. The coordinating server identifies eNodeBs based on, e.g., the tracking area codes, emergency area ids, CGIs, or ECGIs in the warning area list information element.

As the warning area list is in some cases a list of cells, the coordinating server may translate the list of cells, e.g., TACs, emergency area IDs, and/or ECGIs, into a geographic emergency area, in some embodiments. The geographic emergency area may be defined as a polygon made up of points, as a point plus radius, or any other commonly used method for representing areas. The translation may be performed at the coordinating server based on preexisting information at the coordinating server regarding the geographic location and coverage areas of one or more of the base stations in the list of cells identified in the warning request message.

In some embodiments, the coordinating server may then forward the broadcasting request to all the fixed and in-vehicle base stations or eNodeBs present in the potentially danger zone as identified in the warning message. The coordinating server may buffer the warning message and its contents until a Kill Request message is received associated to the Write Replace Warning Request message. The Write Replace Warning request message and the Kill Request message may be associated to each other based on the message-identifier and the serial-number. The coordinating server may buffer the received write-replace warning request message and its content forever until a kill request with message identifier, serial number, and warning area list that match with message identifier, serial number, and warning area list in earlier received write-replace warning request message. In other embodiments, the coordinating server may buffer the received write-replace warning request for a user or mobile operator configured period.

In some embodiments, the coordinating server may also calculate distance of other in-vehicle eNodeBs, not currently in the potential danger zone, from a safe distance from boundary of the emergency area. The user or operator of the network provisions the safe distance value, and while the in-vehicle eNodeB is outside of the safe distance from the boundary of the emergency area, the coordinating server may decide that there is no harm and therefore no need to notify the in-vehicle eNodeB of the potential danger. The coordinating server may therefore not forward write-replace warning request message to eNodeBs outside of the safe distance from the boundary of the emergency area. The coordinating server calculate distance based on the coordinates received from the in-vehicle eNodeBs installed with GPS chip. However, the coordinating server in an alternate embodiment may calculate distance and coordinates of the in-vehicle eNodeB based on measurement reports received from user equipments, other base stations in the neighborhood, etc.

As the coordinating server determines that the in-vehicle eNodeB is approaching the potentially danger zone and within the safe distance from the boundary of the emergency area for which there is an active public warning message, the coordinating server may forward the buffered write-replace warning request message to the in-vehicle eNodeB. In some embodiments, the boundary and safe distance may be a geographic boundary and geographic distance, or may be based on other metrics such as number of cells away, whether a received signal strength indication (RSSI) of a base station in the emergency area is detected, or another metric.

In some embodiments, calculation of the location and position of the eNodeB and distance of other eNodeBs may be performed at the eNodeB or base station. In some embodiments, trajectory may also be predicted and/or calculated. In some embodiments, this calculation may be performed partially at the base station, and/or some information may be shared between the base station and the coordinating node regarding the calculation before or after the calculation. For example, the base station may provide a direction of motion to the coordinating node, which may be based on GPS coordinates or may be based on other information available to the base station. Calculation of a vehicle's position, motion, destination, trajectory, or any other information relating to the location of the vehicle or mobile device may be calculated at least based on the methods described in, for example, US20050125148, which is hereby incorporated by reference in its entirety for all purposes, or in any other method of calculating vehicle position or mobile device position known in the art. Information needed for tracking the vehicle may be sent to a coordinating node either from the vehicle, from the base station, from a UE attached to the base station, or several of the above. Information may be sent periodically or upon request from the coordinating server. In some embodiments the trajectory may be used together with an estimate for the amount of time required for the alert message to traverse the network to alert the base station as it is entering the boundary of the buffer area.

In some embodiments, the coordinating server may request coordinates of the in-vehicle eNodeB when the coordinating server receives write-replace warning request message. In some embodiments, the in-vehicle eNodeB may send its coordinates upon power-on and may periodically send coordinates to the coordinating server. In other embodiments, the coordinating server may periodically request coordinates from the in-vehicle eNodeB. In some other embodiments, the interval between consecutive request for coordinates or interval between consecutive automatic coordinate information message may be dependent of the speed of the vehicle carrying in-vehicle eNodeB. In some other embodiments, whether the coordinating server request for coordinates or the in-vehicle eNodeB sends the coordinates on its own may depend of the type of the vehicle such as e.g. emergency vehicle like police cruiser, ambulance, fire engine, or a public transportation system e.g. bus, train etc. In other embodiments, frequency of the coordination information sent to the coordinating server by the in-vehicle eNodeB may depend on the battery power level of the in-vehicle eNodeB.

The fixed and in-vehicle eNodeBs upon receiving the warning request message may broadcast the warning message to user equipments camped on it, to notify the user equipments of the potential dangerous conditions ahead. The coordinating server may send kill request to some or all of the fixed and in-vehicle eNodeBs that were forwarded the broadcast warning request message when the coordinating server receives Kill Request message from the MME in the core network upon extinguishing of the emergency situation.

In some embodiments, other triggers may be used, for example, the warning request may be cached at the coordinating server and may periodically be checked to result in additional warning messages. The location, direction of motion, or any other information about one or more base stations may be cached at the coordinating server and may be periodically updated. In some embodiments, disaster warnings may be assigned an urgency level, which may be used to determine whether or not a given warning should generate an alert, in conjunction with a threshold distance. In some embodiments, multiple threshold distances corresponding to multiple alerts may be contemplated; these may be stored at the base station or at a coordinating node. Multiple triggers may be stored for different users, different RATs, different times of day, type of user (e.g., public safety user versus civilian user), or any other variable relating to likelihood of a mobile device entering into a dangerous scenario.

As described above and discussed further with reference to drawings, the solution includes following. When the Write-Replace Warning Procedure for emergency area list or tracking area list is received with warning contents, it will be forwarded to the intended broadcast area, at the same time, the HNG can buffer the warning message and its contents (until the Kill Request is not received or the number of warnings are successfully transmitted). The HNG can use SON and the GPS chip in the in-vehicle eNodeB (CWS) to determine the geographic location of the in-vehicle eNodeB with respect to the emergency area CWS. When an in-vehicle eNodeB being served by the HNG is approaching the broadcast area, it will not traditionally receive the warning message until it enters the broadcast area. Using the GPS co-ordinates of the in-vehicle eNodeB, and the known co-ordinates of the fixed CWS, the HNG can determine whether to forward the warning message to the in-vehicle eNodeB approaching the area under threat.

The distance at which the HNG will send the warning message to the moving vehicle's eNodeB can be pre-decided at a safe distance from the boundary cell of the emergency area (or tracking area) under threat. This distance will act as a trigger for the HNG to send the message to the in-vehicle eNodeB. This can potentially send crucial information to the moving vehicle with the in-vehicle eNodeB (CWS), alerting the user (having an LTE capable user equipment) that he is approaching an area under threat from a tsunami or an earthquake or other calamity. Thus, real time information such as this can potentially save one from disastrous situations. This can be made possible by using the HNG, real time SON for GPS coordinates, and the in-vehicle eNodeB solution of Parallel Wireless. The buffered message elements can be cleared once the core indicates that the warning being broadcast is now clear. The core/MME typically sends a Kill Request to kill a continuously broadcast warning. Additionally, the GPS co-ordinates of specific vehicles moving in the direction of the area under threat may be monitored.

In some embodiments, the moving vehicle's eNodeB or base station's location may be predicted at the coordinating node and cached, such that the warning is set to be triggered based on when the predicted position enters the triggering area. This avoids unnecessary communication with the base station. Different freshness/cache validity statistics for caching position data may be used based on information about the speed of the vehicle, typical usage or motion patterns of the vehicle, etc.

Though the solution is described with reference to 4G LTE technology, this disclosure applies to 2G, 3G technology as well. As such eNodeB may be a multi-RAT base station supporting 2G, 3G, 4G, 5G, Wi-Fi, WiMAX, or like of it. The disclosure applies to a base station in mesh network as well. In some embodiments, when the mesh gateway network node receives the warning request message, the mesh gateway network node may forward the warning request message to other mesh network nodes over a mesh network link. The mesh network link may be a Wi-Fi mesh link or may be an LTE mesh link. Emergency alerts may be communicated via the information elements described herein or via other means that have been appreciated by the inventors that are equivalent and/or understood within the protocols and frameworks used in the additional or other RATs. Lists may include base stations with other RATs; multi-RAT base stations may be aware that certain other base stations are multi-RAT base stations and may map identified base stations in one RAT to base stations in another RAT. The alerts may be delivered to users attached on any or all RATs, once received at a given base station.

Though the present solution is described with relation to in-vehicle eNodeBs, the inventors have understood and contemplated that the present disclosure could be adapted for use with any other base stations, including 2G, 3G, 4G, 5G, Wi-Fi, nodeBs, gNodeBs, or other base stations, and that such base stations may or may not be mobile and may or may not be transmitting during periods of motion. For example, a common scenario for mobile base stations in vehicles that provide access to a disaster site is a base station in a vehicle that provides Wi-Fi only access to mobile devices while the vehicle is in motion (such as a public bus; perhaps using satellite or 3G/4G backhaul), and a 3G/4G base station that connects to the network and provides access once the vehicle stops or reduces its velocity below a certain velocity; such a deployment model reduces interference impact on neighboring base stations while effectively providing coverage when the base station is activated. In some embodiments, such a base station may, when activated, obtain any and all relevant information when the 3G/4G base station functionality is activated. In other embodiments, such a base station may obtain the relevant information, including receiving and sharing warnings and alerts to mobile devices, when in motion, but in such a case would deliver the alert messages only to mobile devices connected via Wi-Fi, which may be sufficient to cause a change in the behavior of the users in the vehicle.

Though the present solution is described with relation to a coordinating node, the present disclosure is understood to be contemplated with respect to a mesh network of base stations as well, in some embodiments. Such a deployment architecture is helpful when deploying base stations to provide coverage in a low-coverage area, such as in a disaster. When a mesh network is used for backhaul, one or more nodes in the mesh network may be used to provide any and all of the services described herein with respect to the coordinating node. When a mesh network involves the use of one or more nodes that are gateway nodes that provide backhaul to the rest of the mesh network, the coordinating node functions described herein may be performed at the gateway node(s) of the mesh network.

In some embodiments, warning messages may be sent to neighbor cells having users in a danger zone even if the neighbor cells themselves are not in a danger zone. For example, this may be performed based on receiving UE location coordinates, and/or based on known coverage characteristics of the neighbor cells as covering the danger zone.

In some embodiments involving large networks, a plurality of coordinating nodes may be contemplated, providing the functions described herein. In the case of virtualized networks, more than one coordinating node may be traversed by the potential warning message, in some cases hierarchically, before a message is sent to the base station.

FIGURES

FIG. 1 is a network diagram of a public warning system (PWS). As shown, the PWS may contain a central broadcast entity (CBE) 101, a central broadcast center (CBC) 102, a mobile management entity (MME) 103, and eNodeBs 104 and 105 located in a cell affected by an earthquake 112, and eNodeBs 106 and 107 in neighboring cells. User equipments (UEs) 108a and 108b may be camped on the eNodeB 104, UEs 109a and 109b may be camped on the eNodeB 105. UEs 110a and 111a may be camped on to the eNodeBs 106 and 107 respectively. Further, the eNodeBs 104 and 105 in a cell A 115 may be located in a tracking area 1 113 and the eNodeB 106 in a cell B 116 may be located in a tracking area 2 114. When an earthquake 112 is detected, the CBE 101 may send an emergency information distribution request (not shown in the figure) to the CBC 102. The CBC 102 then create a text to be sent to the UEs such as 108a, 108b, 109a, 109b that may be in the disaster area and needs to be warned of the dangerous or life-threatening situation. The CBC 102 may also identify the affected area by either emergency area id or tracking area id or cell-ids and may send a write-replace warning request message (not shown in the figure) to the MME 103 of the specified area as the eNodeBs 104, 105 and 106 are connected to the MME 103. The write-replace warning request message may contain information such as disaster type, warning message text, message distribution area, primary notification information, etc. The MME 103 may send a response message to the CBC 102 to notify that the message was correctly received. The CBC 102 may then notify the CBE 101 that the distribution request was received, and that processing has begun. The MME 103 may further check a distribution list information in the write-replace warning request message, and if a tracking area identifier list is present in the write-replace warning request message, the MME 103 sends the write-replace warning request message only to the eNodeBs that belong to the tracking area identifiers in the list. However, if no tracking area identifier list is found in the write-replace warning request message by the MME 103, all eNodeBs connected to the MME 103 may be notified of the ongoing emergency by the MME 103. Assuming that the message received from the MME 103 identified tracking area 1 113 and tracking area 2 114, the MME 103 may send write replace warning request message to the eNodeBs in tracking area 1 and tracking area 2 i.e. eNodeBs 104, 105, and 106. The eNodeBs 104, 105, and 106 upon receipt of the write-replace waning request message from the MME 103 may further determine the message distribution area included in the write-replace warning request message and starts broadcast of the message as described further below.

It is evident from the above that an in-vehicle mobile base station does not receive notification from MME about ongoing emergency until they enter into the tracking area or cell or emergency area under warning. By the time, the in-vehicle mobile base station receives warning it may be too late. Parallel Wireless has a solution for this problem that utilizing its coordinating server located in the radio access network and using self-organizing network functionality with in-vehicle base stations with GPS module or chip. As described above, the coordinating server may act as a macro eNodeB to the mobile core network and virtualizes eNodeBs in the radio access network.

Figure 2:
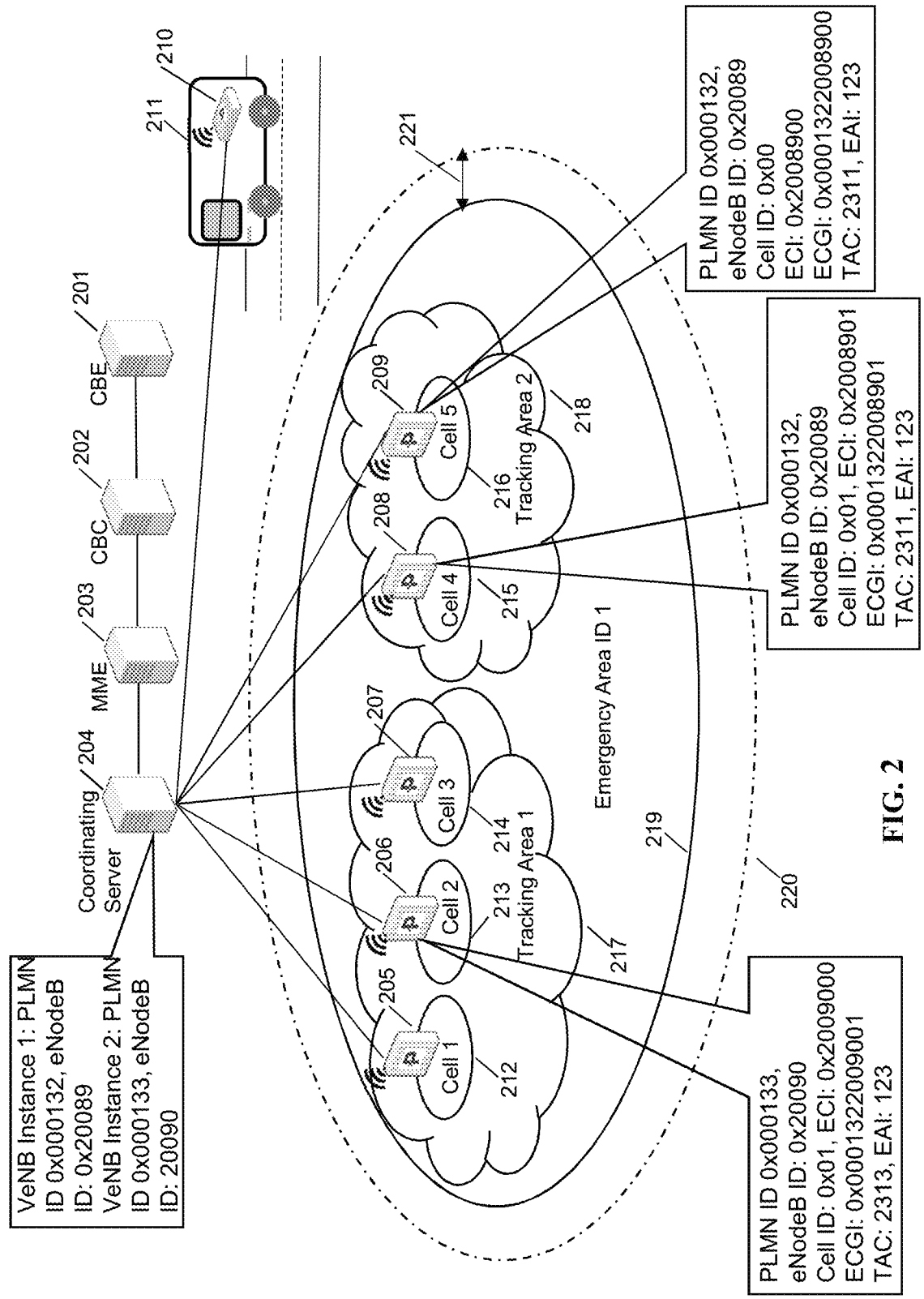
FIG. 2 is an exemplary network architecture diagram, in accordance with some embodiments.

FIG. 2 is an exemplary network architecture diagram in accordance with some embodiments and shows message distribution area with three different granularities. Shown in the figure are a CBE 201, a CBC 202, a MME 203, a coordinating server 204, eNodeBs 205, 206, 207, 208, 209, an in-vehicle eNodeB 210 in a bus 211. eNodeBs 205, 206, 207, 208, and 209 may be in cell 1 212, cell 2 213, cell 3 214, cell 4 215, and cell 5 216 respectively. Cell 1 212, cell 2 213, and cell 3 214 may be associated with tracking area 1 217. Cell 4 215 and cell 5 216 may be associated with tracking area 2 218. Tracking area 1 217 and tracking area 2 218 may be associated with an emergency area id 1 219. Further shown in FIG. 2 is a boundary 220 at a safe distance 221 from the emergency area 219, assuming that a write-replace warning request message from the CBC 202 and the MME 203 to the coordinating server identified warning area zone as emergency area id 1 219. The safe distance 221 may be provisioned as a trigger by a user or a mobile operator at the coordinating server 204. The coordinating server 204 may not send write-replace warning request message for an ongoing emergency presumably in emergency area id 1219 to the in-vehicle eNodeB 210 while the GPS coordinates of the eNodeB 210 indicates eNodeB 210 is outside of safe distance 221 from the boundary of the ongoing warning area.

In accordance with some embodiments, in a 4G LTE network a public warning system (PWS), warning distribution area may be specified in three different granularities, cell level, tracking area level, and emergency area level. In a cell level distribution area, the CBC 202 designates the cell-level distribution areas by sending a list of cell IDs. The emergency information may therefore be broadcasted only to the designated cells. Although, identifying warning area by cell IDs may offer an advantage of being able to pinpoint broadcast distribution to particular areas, it may necessitate a large processing load on network nodes such as CBC, MME, eNodeBs, etc. when the list of cell IDs is long. In a tracking area level distribution area, the warning message distribution area is designated as a list of tracking area identities (TAIs) or tracking area identifiers (TAIs). TAI is an identifier of a tracking area (TA), which is an LTE mobility management area. The warning message broadcast goes out to all of the cells in the TAIs. As shown in FIG. 2, a TAI may be associated to more than one cell and hence when warning area is identified at a tracking area level granularity, the load on the network elements is lighter compared to cell level granularity. In an emergency area level distribution area, a mobile operator user may designate an emergency area that may cover more than one cell. The emergency area therefore may be larger than a cell and may also be independent of the tracking area. Emergency area is a unit of mobility management and may thus allow flexible design for optimization of the distribution area for the affected area according to the type of disaster.

In accordance with some embodiments, the coordinating server 204 may be assigned a virtual eNodeB (VeNB) instance 1 (VeNB1) and a virtual eNodeB (VeNB) instance 2 (VeNB2). The VeNB1 may be provisioned with PLMN ID 0x000132 and eNodeB ID as 0x20089. The VeNB2 may be provisioned with PLMN ID 0x000133 and eNodeB ID as 0x20090. While each eNodeB or base station managed by the coordinating server may be provisioned for cell Id, PLMN ID, eNodeB ID, TAC and EAI, only eNodeB 206, eNode 208 and eNodeB 209 are shown in FIG. 2 as an example. In accordance with the logic provisioned at the coordinating server, when eNodeB 206 connects to the coordinating server 204, the coordinating server 204 may provision or send configuration information to eNodeB 206. For example, the eNodeB 206 may be assigned to server VeNB instance 2, and therefore, may be assigned eNodeB ID 0x20090, cellID 0x01. TAC and EAI may be provisioned at 2313 and 123. The eNodeB 206 may therefore receive warning request message when the warning area list is identified by TAI 2313 or EAI 123 or ECGI 0x00013320090001.

Likewise, when eNodeB 208 connects to the coordinating server 204, the coordinating server 204 may provision or send configuration information to eNodeB 208. For example, the eNodeB 208 may be assigned to server VeNB instance 1, and therefore, may be assigned eNodeB ID 0x20089, cellID 0x01. TAC and EAI may be provisioned at 2311 and 123. The eNodeB 208 may therefore receive warning request message when the warning area list is identified by TAI 2311 or EAI 123 or ECGI 0x0001322008901.

In a similar way, when eNodeB 209 connects to the coordinating server 204, the coordinating server 204 may provision or send configuration information to eNodeB 209. For example, the eNodeB 209 may be assigned to server VeNB instance 1, and therefore, may be assigned eNodeB ID 0x20089, cellID 0x00. TAC and EAI may be provisioned at 2311 and 123. The eNodeB 209 may therefore receive warning request message when the warning area list is identified by TAI 2311 or EAI 123 or ECGI 0x0001322008900.

In accordance with some embodiments, instead of receiving provisioning information from the coordinating server when the eNodeB is connecting to the coordinating server, the eNodeB may be static provisioned.

Figure 3:
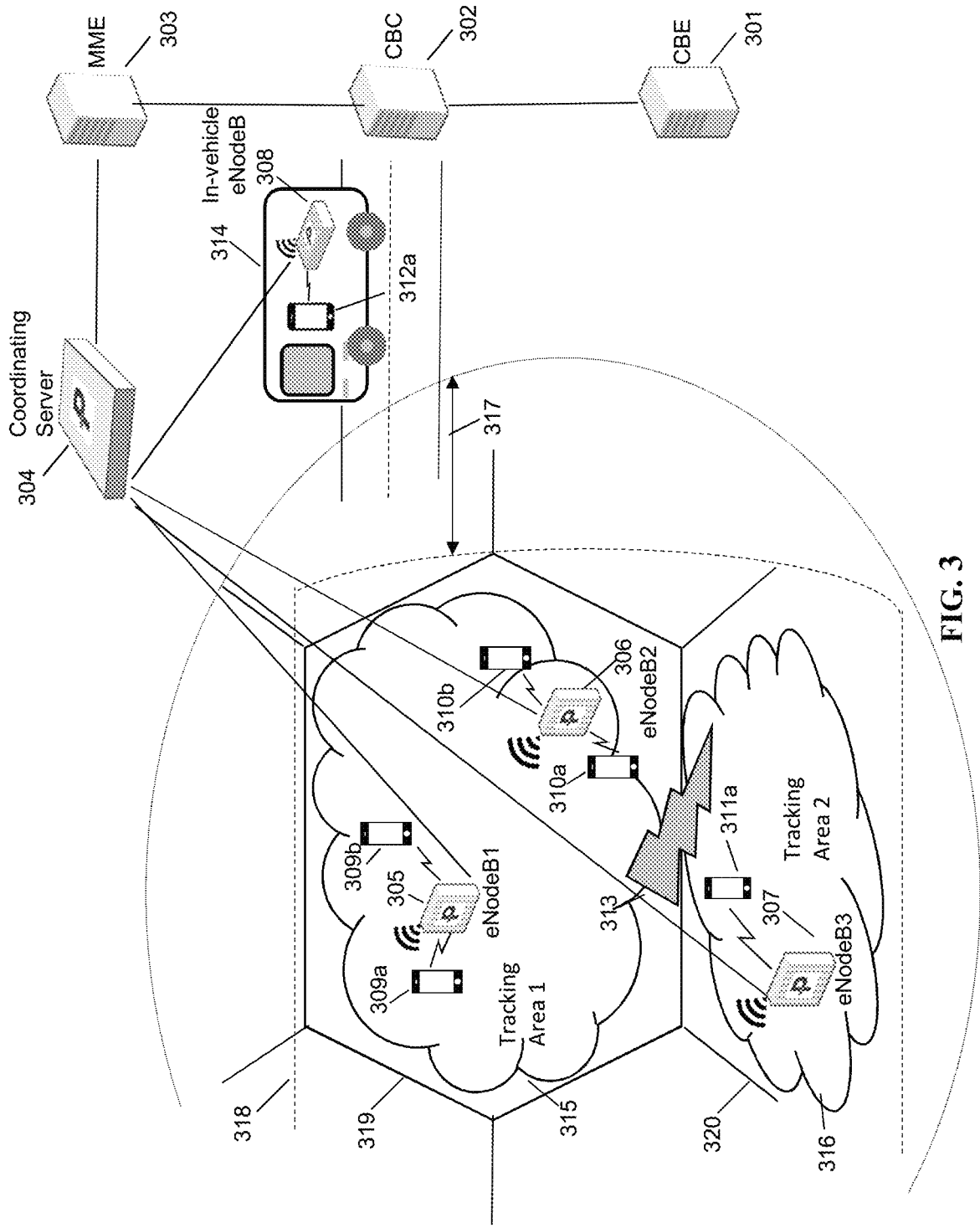
FIG. 3 is a network diagram of a public warning system, in accordance with some embodiments.

FIG. 3 is a network diagram of public warning system in accordance with some embodiments. As shown in the figure, a central broadcast entity (CBE) 301, central broadcast center 302, and mobile management entity 303 may be connected and located in the core network. A coordinating server 304 may be located in radio access network (RAN) and may appear as a macro eNodeB to the core network. The coordinating server 304 may be further connected to and manages an eNodeB1 305, an eNodeB2 306, an eNodeB3 307, and an in-vehicle eNodeB 308. The eNodeB1 305, eNodeB2 306, eNodeB3 307 and the in-vehicle eNodeB 308 may be a base station, a nodeB, a home NodeB (HNB), or a home eNodeB (HeNB). The base station may be multi-RAT base station and may support 2G, 3G, 4G, 5G, a Long Term Evolution (LTE), Wi-Fi, WiMax, or similar technologies.

Further, user equipments 309a and 309b may be camped on to the eNodeB1 305, user equipments 310a and 310b may be camped on to the eNodeB2 306. A user equipment 311a may be camped on to the eNodeB3 307, whereas a user equipment 312a may be camped on to the in-vehicle eNodeB 308. The in-vehicle eNodeB 308 may be installed in a bus 314 carrying passengers.

The eNodeB1 305 and eNodeB2 306 may be located in a cell A 319. The eNodeB3 307 may be located in a cell B 320. The cell A 319 may be in a tracking area 1 315 and the cell B 320 may be in a tracking area 2 316. Both the tracking area 1 and 2, 315 and 316, may be in an emergency area id 318. While the emergency area id 318 may cover multiple tracking areas for emergency notification purpose, a user or a mobile operator may specify a safe distance 317 from the boundary of the emergency area.

In accordance with some embodiments, the in-vehicle eNodeB 308 may not be notified of the ongoing emergency while the bus 314 is outside of the safe distance 317. The coordinating server 304 may determine distance of bus 314 from the boundary of emergency area 318 based on coordinates obtained from a GPS chip/module (not shown in the figure) in in-vehicle eNodeB 308 and self-organizing network module (not shown in the figure) at the coordinating server 304. Once the coordinating server 304 determines that the bus 314 approaches the emergency area under active warning notification and within the safe distance 317, the coordinating server 304 may send the buffered write-replace warning request message to the in-vehicle eNodeB 308. The coordinating server 304 when receives the write-replace warning request message from the MME 303, the coordinating server 304 forwards the write-replace warning request message to the eNodeBs currently within a warning area list information element or field in the write-replace warning request message. The warning area list may be identified by either a list of tracking area identifier(s), a list of emergency area identifier(s), a list of ECGI(s). The coordinating server 304 may also further buffer or save the write-replace warning request message and its content until a kill request message received from the MME 303 for the entire warning area list received in the write-replace warning request message (or until a specified number of warning messages is successfully transmitted). Therefore, when a mobile in-vehicle eNodeB 308 that may not be in the warning zone and hence not notified of the ongoing emergency when the coordinating server 304 received the write-replace warning request message from the MME 303, the in-vehicle eNodeB 308 may be notified when the coordinating server determines that the in-vehicle eNodeB 308 within the safe distance 317 from the boundary of the ongoing emergency zone.

In accordance with some embodiments, the coordinating server 304 virtualizes all cells connected on the radio access side and presents itself as a large macro eNodeB towards to the MME 303 in the mobile operator's core network. The coordinating server 304 may be allocated twenty-eight-bit macro eNodeB ID and a plurality of eNodeBs in the radio access network connecting to the coordinating server 304 may be allocated a twenty-eight bit E-UTRAN Cell Identifier (ECI). The ECI may have a twenty-bit eNodeB ID that is same as most significant twenty-bit of macro eNodeB ID of the coordinating server 304. The rest eight-bit of the ECI may be formed from a cell id and assigned to each eNodeB when it connects to the coordinating server 304. Therefore, one macro eNodeB ID or virtual eNodeB ID instance may virtualize up to two hundred fifty-five cells or eNodeBs. Each eNodeB further provisioned for a PLMN ID as well, where the PLMN ID is further formed based on MCC and MNC. The coordinating server identifies the eNodeBs to forward the received write-replace warning request message from the MME 303 based on tracking area id list, emergency area id list, or ECGI list. Each eNodeB managed by the coordinating server 304 may be assigned an emergency area id, a tracking area id, and an ECGI during startup and establishing connection to the coordinating server 304.

Figure 4:
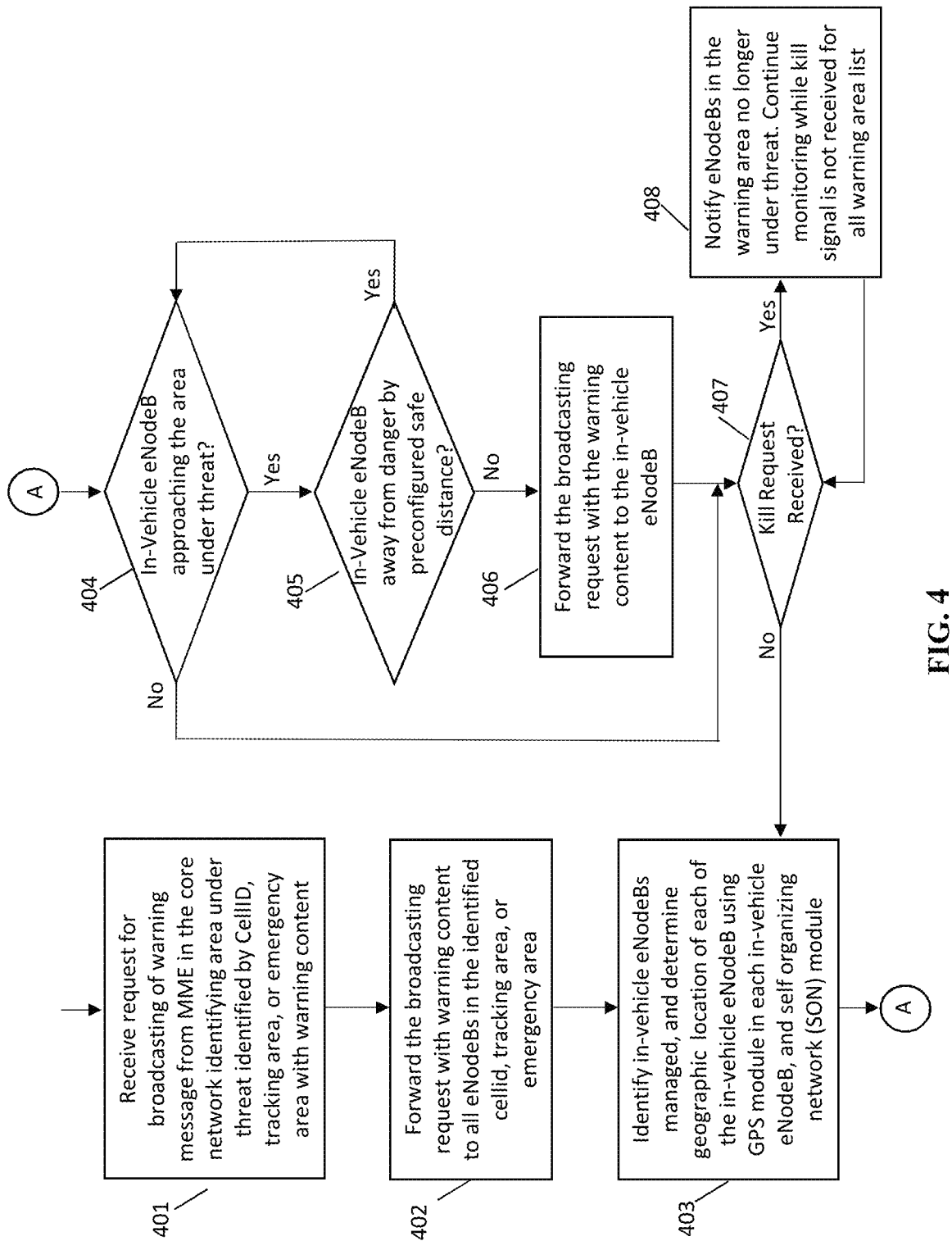
FIG. 4 is a flow chart of a Write-Replace procedure, in accordance with some embodiments.

FIG. 4 describes a flow-chart of a Write-Replace procedure in accordance with some embodiments. At step 401, the coordinating server 304 may receive a request for broadcasting of a warning message from the MME 303 in the core network. The MME 303 may be further connected to the CBC 302 and the CBE 301. Upon detection of an emergency such as the earthquake 313, the CBC 302 may receive a request for emergency distribution from the CBE 301. The CBC 302 may further create a text to be sent to the user equipments such as mobile devices, smart phones, laptops, personal digital assistants (PDAs) that may be camped on the eNodeBs, base stations, HNBs, HeNBs, NodeBs, etc. The CBC 302 may identify a distribution area to be notified based on the emergency distribution request from the CBE 301 and may identify the distribution area in the warning area list information element or field of the write-replace warning request message. The CBC 302 may form a Write-Replace Warning Request Message in accordance with 3GPP TS 36.413, which is hereby incorporated by reference in its entirety for all purposes, and forward it to the MME 303. The MME 303 may send the write-replace warning request message to the coordinating server 304 that appears to the MME as a macro eNodeB virtualizing many eNodeBs located in the radio access network. Upon receipt of the write-replace warning request message, the coordinating server forwards the warning request message to eNodeBs managed by the coordinating server and presently in the warning areas identified by either a tracking area id, a ECGI, or an emergency id, as shown at step 402. The coordinating server may further save or buffer the received write-replace warning request message so that in-vehicle eNodeBs, such as the in-vehicle eNodeB 308, that may be notified later when in-vehicle eNodeB 308 enters or within the safe distance from a boundary of the emergency area. The safe distance may be configurable by a user or a mobile operator at the coordination server 304.

In accordance with some embodiments, at step 403, the coordinating server 304 identifies in-vehicle eNodeBs that are managed by the coordinating server. The coordinating server receives coordinates from the in-vehicle eNodeBs, e.g. in-vehicle eNodeB 308. The in-vehicle eNodeB 308 may be installed with a GPS chip/module and may send its coordinates to the coordinating server 304. With the self-organizing network (SON) module at the coordinating server 304, the coordinating server may determine the direction of the in-vehicle eNodeB 308 travelling and distance from the boundary of emergency area under active warning. As shown in step 404 and 405, if the in-vehicle eNodeB 308 though moving in the direction of the area under threat and active warning, the in-vehicle eNodeB 308 may not be sent write-replace warning request message, if the coordinating server 304 may find the in-vehicle eNodeB 308 outside of the safe distance 317. At step 405, when the coordinating server 304 finds the in-vehicle eNodeB 308 within the safe distance 317 from the current active warning area zone, at step 406, the coordinating server 304 forwards the buffered write-replace warning request message to the eNodeB 308. As shown in the FIG. 4, at step 407, the coordinating server 304 may wait to receive a kill request message from the MME 303. Until the kill request message with each warning area list previously identified in the write-replace warning request message is received from the MME 303, the coordinating server may continue to keep the buffered write-replace warning request message and any in-vehicle eNodeBs approaching the warning area zone as shown in step 403. However, when the coordinating server 304 receives the kill request message from the MME 303 with warning area list previously identified in the write-replace warning request message, at step 408, the coordinating server may send the kill request to the eNodeBs in the warning area list field in the kill request. The warning area list in the write-replace warning request message and the kill request message may be formed in the same way as identified in 3GPP TS 36.413. When the coordinating server receives a kill request message with a message identifier and a serial number, both matching with the message identifier and the serial number received in the prior write-replace warning request message, and for all active warning zones identified in the warning area list information element in the prior write-replace warning request message, the coordinating server may free the saved or buffered write-replace warning request message and its content. The message identifier and the serial number in the kill request message identifies which earlier sent warning message may no longer need to be broadcast.

Figure 5:
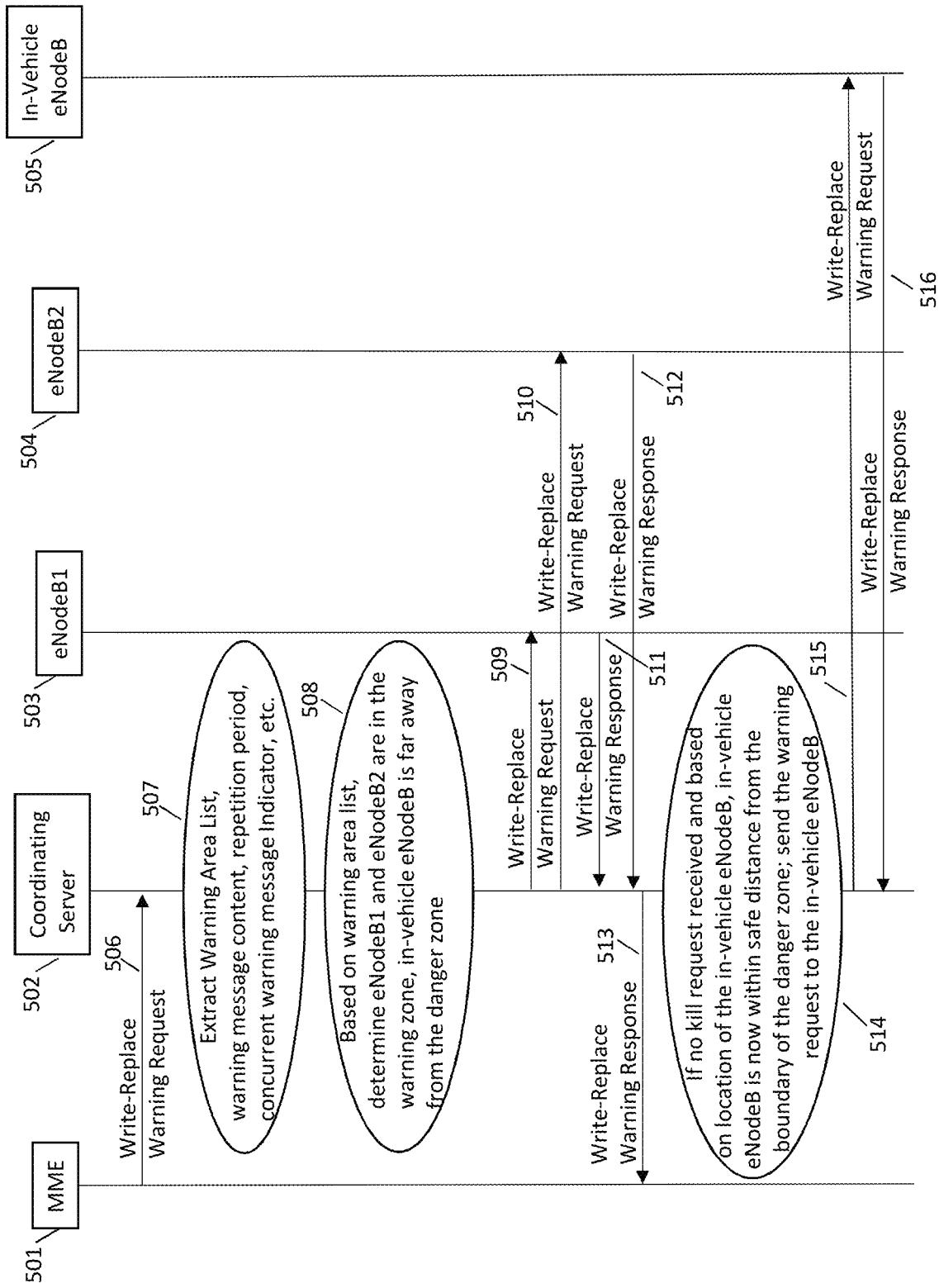
FIG. 5 is a message flow ladder diagram between elements of public warning system in a 4G Long Term Evolution (LTE) network, in accordance with some embodiments.

FIG. 5 is a message flow ladder diagram between elements of public warning system in a 4G Long Term Evolution (LTE) network in accordance with some embodiments. As shown, the messages exchanged between a MME 501, a coordinating server 502, an eNodeB1 503, an eNodeB2 504, and an in-vehicle eNodeB 505 is described for a public warning system (PWS). As described before, the MME 501 receives Write-Replace Warning Request message from the CBC 302 (not shown in the figure) and forwards the same to the coordinating server 502 as write-replace warning request message 506.

In accordance with some embodiments, at 507, the coordinating server 502 may extract message identifier, serial number, warning area list, warning message content, repetition period, concurrent warning message indicator, and other information elements from the received message 506. The coordinating server 502 may check the extracted message identifier and serial number information against previously received message identifier and serial number in the write-replace warning request message. If message identifier and serial number do not match with the previously received message identifier and serial number or no write-replace warning request message previously received, the coordinating server 502 may consider the received warning request as a write request. But, if message identifier and serial number match with the previously received message identifier and serial number, the coordinating server 502 may consider the received warning request as a replace request. However, if broadcast of one or more warning messages are already ongoing in certain warning area zones, if the concurrent warning message indicator information element present, the coordinating server may send the received warning request message, in addition to previously received write-replace warning request message that may have not been extinguished by a kill request message. The concurrent warning message indicator information element when present and if the number of broadcast requested information element received with value 0, the coordinating server may broadcast the received warning request message indefinitely until requested otherwise to stop broadcasting, except is the repetition period information element in the received warning request message set to 0. As shown at 508, the coordinating server identifies eNodeBs within the warning zone based on the warning area list information element. If no warning area list information element received in the warning request message, then all eNodeBs managed by the coordinating server may be forwarded the received warning request message. Warning message transmission procedures identified in 3GPP TS 36.413 is hereby incorporated by reference in its entirety for all purposes.

In accordance with some embodiments, at 508, the coordinating server 502 determines the eNodeBs that are in the warning area zone. The coordinating server 502 identifies the eNodeBs based on either a list of tracking area identifiers, a list of emergency area identifiers, or a list of ECGIs received in the warning area list information element and extracted as shown in 507 above. The coordinating server 502 may further receive coordinates from the in-vehicle eNodeB 505 having GPS chip/module, and determine with a self-organizing network (SON) module at the coordinating server 502 that the in-vehicle eNodeB 505 is outside of a safe distance, e.g. 317 in FIG. 3. While the coordinating server 502 determines based on analysis performed at step 507 and 508, that the eNodeB1 503 and the eNodeB2 504 are currently in the warning zones, and may therefore forward Write-Replace Warning Request Messages 509 and 510 to the eNodeB1 503 and the eNodeB2 504 respectively.

The eNodeBs 503 and 504 may further notify user equipments attached to each of them following procedures identified in 3GPP TS 36.413. When the coordinating server 502 receives write-replace warning response message 511 and 512 from the eNodeB1 503 and the eNodeB2 504 respectively, the coordinating server 502 may send Write-Replace Warning Response message to the MME 501 in the core network.

In accordance with some embodiments, at 514, if no kill request message is received at the coordinating server 502 with warning area zones for which the coordinating server 502 has forwarded the warning request messages 509 and 510, the coordinating server may monitor in-vehicle eNodeB 505 for movement. If the coordinates received from a GPS chip/module of the in-vehicle eNodeB 505 indicates that the in-vehicle eNodeB 505 is approaching the area with currently active warning for emergency, and the in-vehicle eNodeB is within the safe distance from the boundary of the active emergency warning zone, the coordinating server 502 may forward the buffered or saved write-replace warning request message 515 to the in-vehicle eNodeB 505. The in-vehicle eNodeB 505 may respond with Write-Replace Warning Response message 516 to the coordinating server 502.

Figure 6:
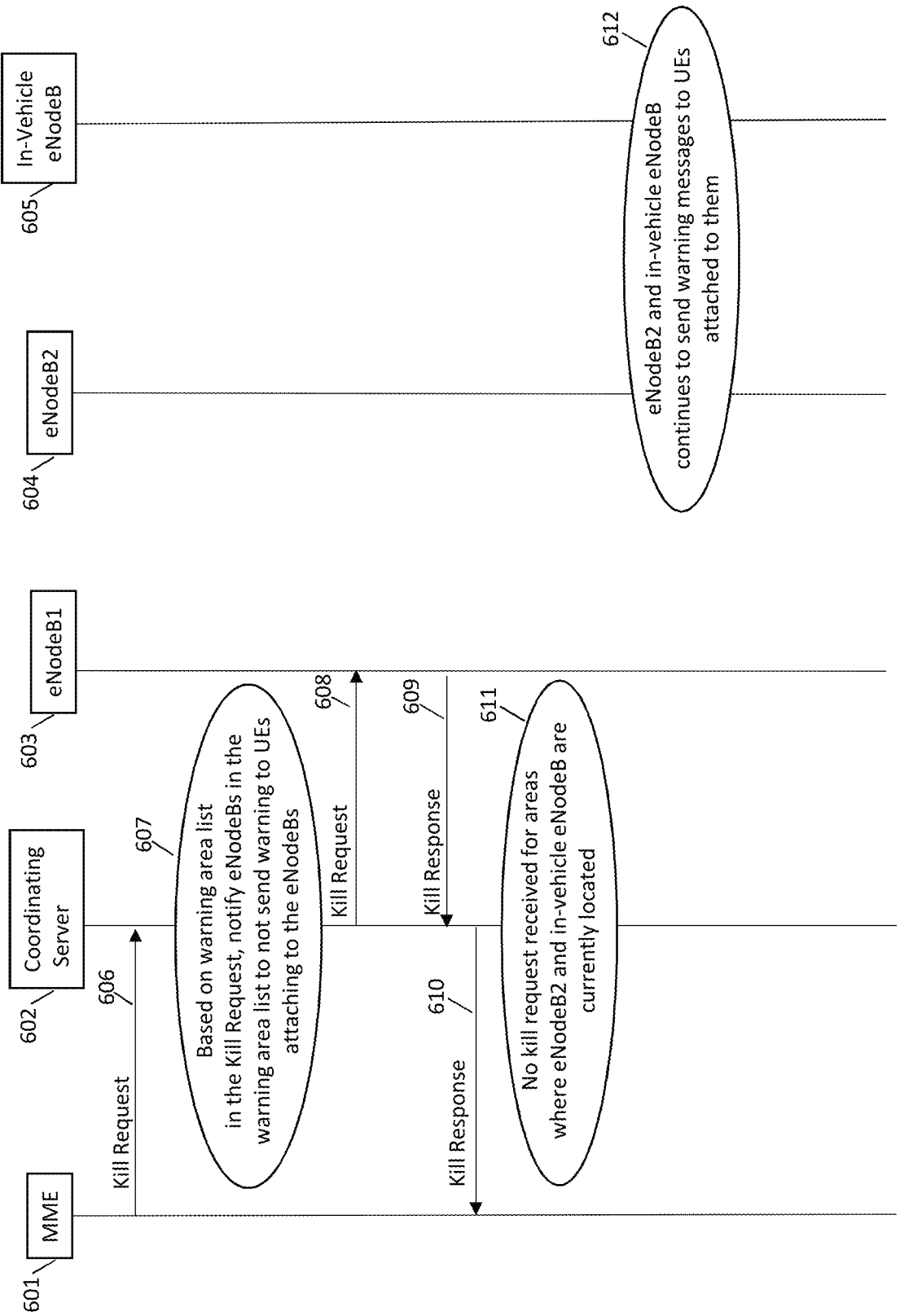
FIG. 6 is a message flow ladder diagram between elements of public warning system in a 4G Long Term Evolution (LTE) network, in accordance with some embodiments.

FIG. 6 is a message flow ladder diagram between elements of public warning system in a 4G Long Term Evolution (LTE) network in accordance with some embodiments. In accordance with some embodiments, messages exchanged between elements of a public warning system (PWS), a MME 601, a coordinating server 602, an eNodeB1 603, an eNodeB2 604, and an in-vehicle eNodeB 605 is shown when the emergency is extinguished and no longer there is any need to continue broadcast of the warning message. The MME 601 may forward a kill request message 606 to the coordinating server 602, the kill request message 606 may have been sent to the MME 601 by the CBC 302 when emergency removed, and broadcast warning messages may need to be stopped. The coordinating server extracts from the received kill request message 606 message identifier, serial number, warning area list, and other information elements. The coordination server matches the message identifier and serial number against the message identifier and serial number received in write-replace warning request message and for which the coordinating server 602 forwarded the warning request message to eNodeBs, e.g. 603, 604, and 605. If the message identifier and serial number matches, the coordinating server sends kill request message to eNodeBs identified in the warning area list information element either as a list of emergency area identifier(s), a list of ECGI(s), or a list of tracking area identifier(s). Assuming for example that, the kill request message 606 only identifies one ECGI that is eNodeB1 603, the kill request message 608 may only be forwarded to eNodeB1 603. The eNodeB2 604 and the in-vehicle eNodeB 605 may continue to broadcast the warning message as shown in 611 and 612. The eNodeB1 603 may respond with kill response 609 indicating that the broadcast of warning message has been successfully removed. The coordinating server may forward the kill response 609 to the MME 601 as a kill response message 610.

Figure 7:
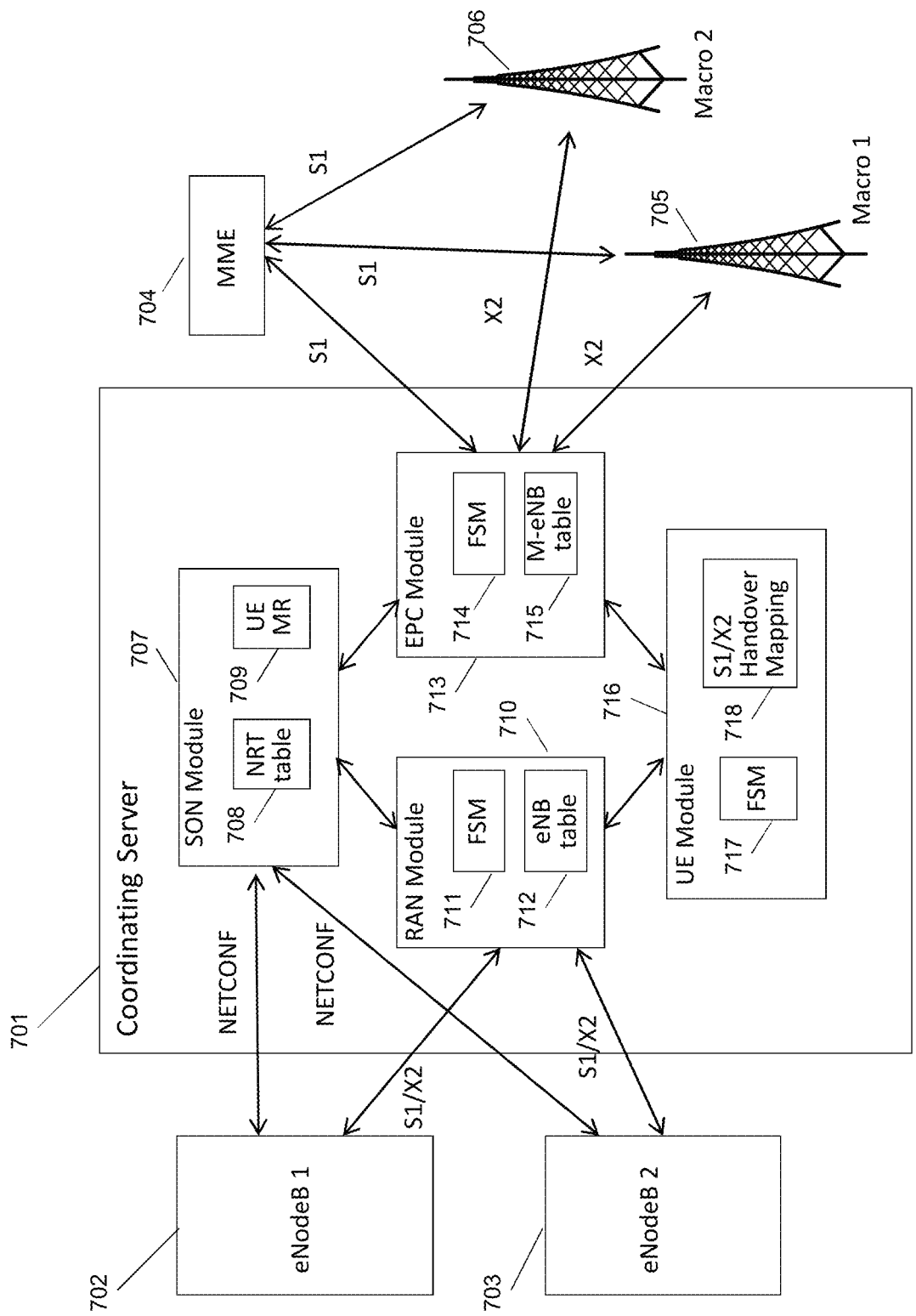
FIG. 7 is a schematic architecture diagram of an exemplary coordinating server, in accordance with some embodiments.

FIG. 7 is a schematic diagram of a coordinating server in a Long Term Evolution (LTE) architecture, in accordance with some embodiments. Coordinating server 701, also may be referred as a gateway in this disclosure, provides services to, and is coupled to, eNodeB 1 702 and eNodeB 2 703, on a RAN side of a network (i.e., inside of the gateway). Coordinating server 701 provides services to, and is coupled to, MME 704, macro eNodeB 705, and macro eNodeB 706, on a core network side of the network (outside of the gateway).

Within coordinating server 701 are self-organizing network (SON) module 711, containing neighbor relation table (NRT) 712 and UE measurement report processing module 713; evolved packet core (EPC) module 721, containing EPC finite state machine module 722 and macro eNodeB table 723; radio access network (RAN) module 731, containing eNodeB finite state machine module 732 and eNodeB table 734; and user equipment (UE) module 741, containing UE finite state machine module 742 and S1/X2 handover mapping table 743. Each of modules 711, 721, 731, and 741 are coupled to each other within coordinating server 701, and may execute on one or more shared processors (not shown) coupled with memory (not shown).

In some embodiments, SON module 711 may perform NRT maintenance, load information processing and fractional frequency reuse (FFR) processing; RAN module 731 may perform X2 association management with eNodeBs 702, 703; EPC module 721 may perform X2 association management with macro eNodeBs 705, 706; and UE module may perform X2 handover and S1/X2 translation between eNodeBs 702, 703 and macro eNodeBs 705, 706. All the above managers/modules interact with each other to accomplish the assigned functionality.

Figure 8:
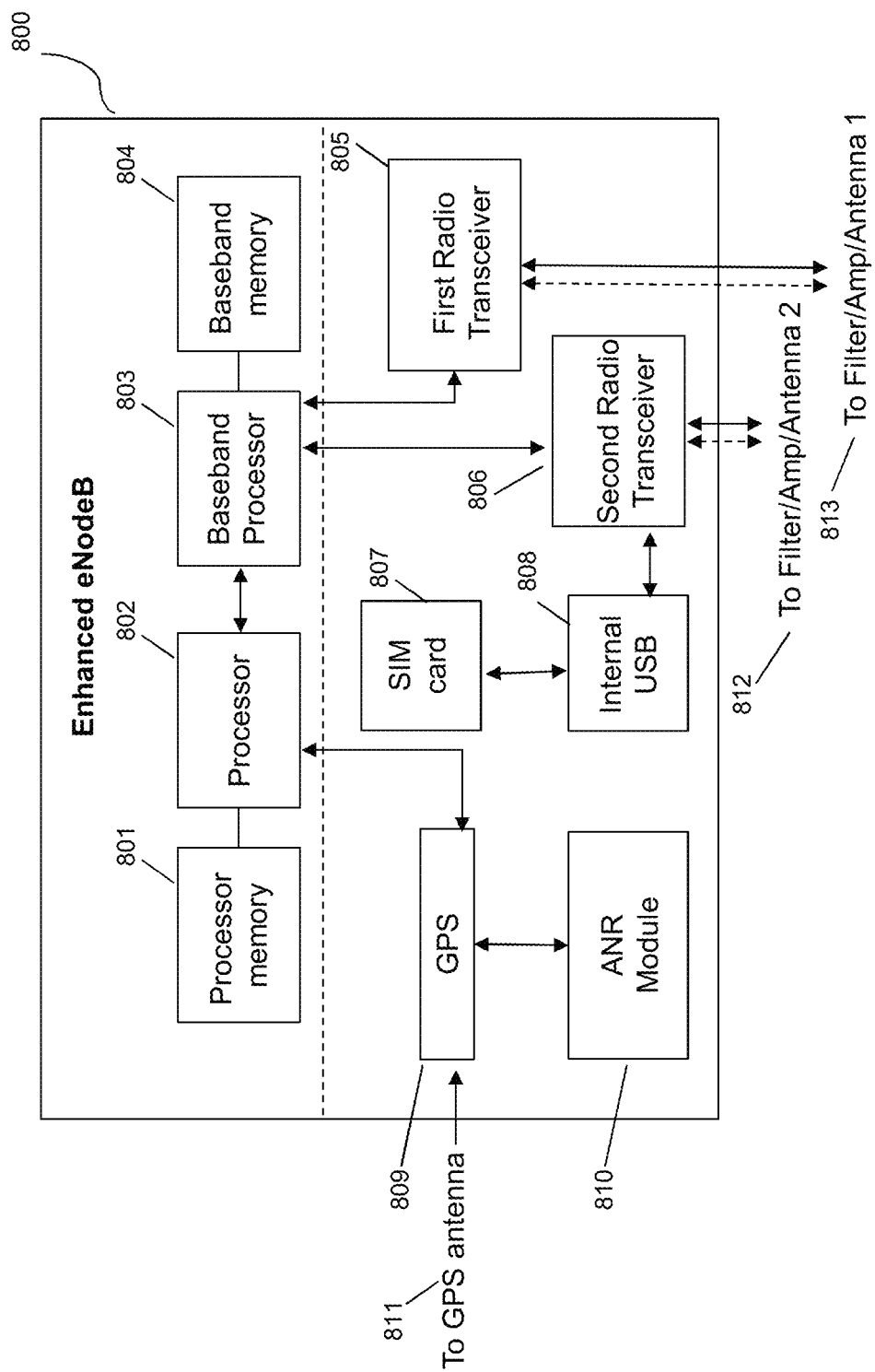
FIG. 8 is a schematic architecture diagram of an exemplary enhanced eNodeB, in accordance with some embodiments.

FIG. 8 is an enhanced eNodeB for performing the methods described herein, in accordance with some embodiments. eNodeB 800 may include processor 802, processor memory 801 in communication with the processor, baseband processor 803, and baseband processor memory 804 in communication with the baseband processor. The eNodeB 800 may also include first radio transceiver 805 and second radio transceiver 806, internal universal serial bus (USB) port 808, and subscriber information module card (SIM card) 807 coupled to USB port 808. In some embodiments, the second radio transceiver 806 itself may be coupled to USB port 808, and communications from the baseband processor may be passed through USB port 808. The second radio transceiver may be used for wirelessly backhauling eNodeB 800.

Processor 802 and baseband processor 803 are in communication with one another. Processor 802 may perform routing functions, and may determine if/when a switch in network configuration is needed. Baseband processor 803 may generate and receive radio signals for both radio transceivers 805 and 806, based on instructions from processor 802. In some embodiments, processors 802 and 803 may be on the same physical logic board. In other embodiments, they may be on separate logic boards.

Processor 802 may identify the appropriate network configuration, and may perform routing of packets from one network interface to another accordingly. Processor 802 may use memory 801, in particular to store a routing table to be used for routing packets. Baseband processor 803 may perform operations to generate the radio frequency signals for transmission or retransmission by both transceivers 805 and 806. Baseband processor 803 may also perform operations to decode signals received by transceivers 805 and 806. Baseband processor 803 may use memory 804 to perform these tasks.

The first radio transceiver 805 may be a radio transceiver capable of providing LTE eNodeB functionality, and may be capable of higher power and multi-channel OFDMA. The second radio transceiver 806 may be a radio transceiver capable of providing LTE UE functionality. Both transceivers 805 and 806 may be capable of receiving and transmitting on one or more LTE bands. In some embodiments, either or both of transceivers 805 and 806 may be capable of providing both LTE eNodeB and LTE UE functionality. Transceiver 805 may be coupled to processor 802 via a Peripheral Component Interconnect-Express (PCI-E) bus, and/or via a daughtercard. As transceiver 806 is for providing LTE UE functionality, in effect emulating a user equipment, it may be connected via the same or different PCI-E bus, or by a USB bus, and may also be coupled to SIM card 807. First transceiver 805 may be coupled to first radio frequency (RF) chain (filter, amplifier, antenna) 813, and second transceiver 414 may be coupled to second RF chain (filter, amplifier, antenna) 812.

SIM card 807 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or another parameter needed to identify a UE. Special parameters may also be stored in the SIM card or provided by the processor during processing to identify to a target eNodeB that device 800 is not an ordinary UE but instead is a special UE for providing backhaul to device 800.

Wired backhaul, or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 805 and 806, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 802 for reconfiguration.

A GPS module 809 may also be included, and may be in communication with a GPS antenna 811 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 810 may also be present and may run on processor 802 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Alternatives

While the solution is described here using a coordinating server, one skilled in the art may recognize and appreciate that the method disclosed here may be applied at the other network elements. In some embodiments, the method disclosed here may be implemented using a proxy or a gateway server. The proxy or the gateway server may have information for association between eNodeBs and the tracking area id or emergency area id or cell id that each eNodeB belongs to. Therefore, when the MME receives write-replace warning request message, the MME may forward the message to the proxy or the gateway server. The proxy or the gateway server then distribute the write-replace warning message to affected cell. The proxy or the gateway server may be situated in the mobile operator's core network or radio access network. The proxy or the gateway server may also monitor the coordinates of the in-vehicle eNodeBs either using self-organizing network (SON) module and GPS chip installed at the in-vehicle eNodeBs, or may determine proximate location based on measurements reports from managed fixed and in-vehicle eNodeBs.

In some alternate embodiments, the disclosed method may be performed by the MME. The MME may know coordinates of each fixed eNodeB connected to it or may monitor or receive coordinates information from each in-vehicle eNodeBs. The MME then when receives write-replace warning request message may forward the warning request message to fixed and in-vehicle eNodeBs in the warning area zone.

In some alternate embodiments, the coordinating server, the proxy server or the gateway server, or the MME may notify the base stations or eNodeBs that are not in the warning area zone, but in neighbor cells. The eNodeBs or base stations in neighbor cells may forward the warning request message to user equipments that are within a safe distance from the boundary of the current emergency zone and connected to eNodeBs in neighboring cells and not in the warning area zone. The current emergency zone may be one or more tracking areas, one or more cell ids, and/or one or more emergency area ids.

In some alternate embodiments, the coordinating server may format a write-replace warning request message with warning area list identified by a list of emergency area identifier(s), a list of ECGI(s), and a list of tracking area identifiers. The eNodeB receiving write-replace warning request may identify the warning area identification type based on the bit length, as ECGI, TAI, and EAI, each are of different bit lengths.

The above-described features and applications can be implemented as software processes that are specified as a set of instructions recorded on a computer-readable storage medium (also referred to as computer readable medium). When these instructions are executed by one or more processing unit(s) (e.g. one or more processors, cores of processors, or other processing units), they cause the processing unit(s) to perform the actions indicated in the instructions. Examples of computer readable media include, but are not limited to, CD-ROMs, flash drives, hard drives, RAM chips, EPROMs, etc. The computer-readable media does not include carrier waves and electronic signals passing wirelessly or wired connections.

In the specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronics systems, define one or more specific machine implementations that execute and perform the operations of the software programs.

A computer program (also known as program, software, software application, script, or code) can be written in any form of programming language, including compiled or interpreted languages, declarative or procedural languages, and it can be deployed in any form, including as a standalone program or as a module, component, subroutine, object, or another unit suitable for use in a computing environment. A computer program may, but need not correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

These functions described above can be implemented in digital electronic circuitry, in computer software, hardware, or firmware. The techniques can be implemented using one or more computer program products. Programmable processors and computers can be included in or packaged as mobile devices. The process and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), readable compact discs (CD-R), rewritable compact discs (CD-RW), read-only digital versatile discs (e.g., DVD-ROM, dual-layer DVD-ROM), a variety of recordable/rewritable DVDs (e.g. DVD-RAM, DVD-RW, DVD+RW, etc.), flash memory (e.g., SD cards, mini-SD cards, micro-SD cards, etc.), magnetic or solid-state hard drives, read-only and recordable Blu-Ray® discs, ultra-density optical discs, any other optical or magnetic media, and floppy disks. The computer-readable media can store a computer program that is executed by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored in the circuit itself.

As used in this specification and any claims of this application, the terms "computer", "server", "processor", and "memory" all refer to electronic or other technological devices. These terms exclude people or groups of people. For the purpose of the specification, the terms display or displaying means displaying on an electronic device. As used in this specification and any claims of this application, the terms "computer-readable media" and "computer readable medium" are entirely restricted to tangible, physical objects that store information in a form that is readable by a computer. These terms exclude any wireless, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, or any other available monitor types, for displaying information to the user and a keyboard and a pointing device, e.g., mouse or trackball, by which the user can provide input to the computer. Other kinds of devices can be used to provide for interaction with a user as well; for example, feedback provided to the user can be any form of sensory feedback, e.g., visual feedback, tactile feedback, or auditory feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication network include a local area network ("LAN"), an inter-network (e.g., the Internet), and peer-to-peer networks (e.g., ad-hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purpose of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and system can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in singular is not intended to mean "one and only one" unless specifically so states, but rather "one or more." Unless expressly stated otherwise, the term "some" refers to one or more. Pronouns in the masculine (e.g., his) include the feminine and neuter gender (e.g., her and its) and vice versa. Headings and subheadings, if any, are used for convenience only, and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations or one or more configurations. A phrase, for example, a configuration may refer to one or more configurations and vice versa.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention, which is specified in the following claims.

The invention claimed is:

1. A method, comprising:
    sending position information reflecting a current position of a base station to a coordinating server;
    receiving a warning request message from an operator core network containing an emergency area;
    calculating a geographic area corresponding to an emergency tracking area by translating the emergency area from a set of base stations to the geographic area;
    determining whether the base station is outside of a threshold distance from the geographic boundary of the emergency tracking area; and
    sending the warning request message to the base station before the base station is within the threshold distance from the geographic boundary of the emergency tracking area; and
    wherein the base station is associated with the coordinating server as a virtual base station of the coordinating server, such that the operator core network addresses the base station through the virtual base station at the coordinating server, wherein the base station is further configured to provide at least one of 3G, 4G and 5G access from a vehicle, the base station being mounted in the vehicle wherein the coordinating server virtualizes cells connected on an access side and presents itself as a large base station towards a mobile operator's core network.

2. The method of claim 1, further comprising: calculating a future position of the base station at the coordinating server; and tracking the current position of the base station over time at the coordinating server for sending the warning message.

3. The method of claim 1, further comprising determining, based on the current position of the base station and based on a geographic boundary of the emergency area and based on the threshold distance, whether the base station is physically located within the threshold distance of the emergency area.

4. The method of claim 1, wherein the position information reflecting the current position of the base station is based on global positioning system (GPS) coordinates, and the threshold distance is a distance in miles or kilometers.

5. The method of claim 1, wherein the base station is currently stationary and the base station is configured to request provisioning information from the coordinating server when the base station activates.

6. The method of claim 1, wherein the warning message is one of a list of tracking area codes, emergency area IDs, cell global identifiers (CGIs), or extended cell global identifiers (ECGIs), and is received from a central broadcast center.

7. The method of claim 1, wherein the base station is a multi-radio access technology (multi-RAT) base station, and wherein the base station is configured to further deliver alert messages to users on a plurality of RATs.

8. The method of claim 1, wherein the base station is a multi-radio access technology (multi-RAT) base station configured to set up a mesh network with other multi-RAT base stations when deployed in a mesh network configuration to an area without network coverage.

9. The method of claim 1, periodically sending the information reflecting the current physical location of the base station, or sending the information reflecting the current physical location of the base station upon request from the coordinating server.

10. The method of claim 1, wherein the warning message is a write-replace warning request message, and wherein the base station is a Long Term Evolution (LTE) base station, and further comprising receiving a warning request message from a central broadcast center (CBC) in an operator core network.

11. A base station in a mobile network, comprising:
    a processor; and
    a memory coupled to the processor, the memory containing instructions which, when executed by the processor, cause the base station to perform:
        sending position information reflecting a current position of the base station to a coordinating server;
        receiving a warning request message from an operator core network containing an emergency area;
        calculating a geographic area corresponding to an emergency tracking area by translating the emergency area from a set of base stations to the geographic area;
        determining whether the base station is outside of a threshold distance from the geographic boundary of the emergency tracking area; and sending the warning request message to the base station before the base station is within the threshold distance from the geographic boundary of the emergency tracking area; and wherein the base station is associated with the coordinating server as a virtual base station of the coordinating server, such that the operator core network addresses the base station through the virtual base station at the coordinating server, and wherein the base station is further configured to provide at least one of 3G, 4G and 5G access from a vehicle, the base station being mounted in the vehicle wherein the coordinating server virtualizes all cells connected on an access side and presents itself as a large base station towards a mobile operator's core network.

12. The base station of claim 11, wherein the base station is a multi-radio access technology (multi-RAT) base station, and wherein the base station is configured to further deliver alert messages to users on a plurality of RATs.

13. The base station of claim 11, wherein the base station is a multi-radio access technology (multi-RAT) base station configured to set up a mesh network with other multi-RAT base stations when deployed in a mesh network configuration to an area without network coverage.

14. The method of claim 1, further comprising sending a second position information reflecting a prior position of the base station to the coordinating server, the prior position being different from the current position.

15. The base station of claim 11, wherein the base station sends a second position information reflecting a prior position of the base station to the coordinating server, the prior position being different from the current position.

* * * * *